Patented Dec. 16, 1941

2,266,233

UNITED STATES PATENT OFFICE 2,266,233

PIGMENT TREATMENT

Ray L. McCleary, Richardson Park, Del., assignor to E. I. du Pont de Nemours & Company, Wilmington, Del., a corporation of Delaware No Drawing. Application May 2, 1940,
Serial No. 332,989

20 Claims. (Cl. 106—300)

This invention relates to a process for producing improved pigments containing calcium compounds. More particularly it relates to a process for producing composite pigments containing calcium sulfate. Still more particularly it relates to composite pigments containing titanium dioxide and calcium sulfate.

The preparation of pigments containing calcium compounds, particularly calcium sulfate, is well-known to those versed in the art. One of the common methods is to prepare calcium sulfate, either as anhydrite or as gypsum and suspend it in a solution of titanium, hydrolize the titanium thereby precipitating titanium dioxide in a hydrated form in close association with the calcium sulfate after which the resulting product is washed and then calcined. Another prior art process comprises preparing a fine calcium sulfate by precipitation from lime and sulfuric acid, washing, blending with a previously calcined titanium dioxide pigment, making pH adjustments, and thereafter calcining the resulting product.

Of all the common white pigments, those containing calcium sulfate have the greatest degree of water sensitivity. This substance is slightly water-soluble and it is well-known that calcium ion has a strong flocculating action on aqueous suspensions. At the same time the surface of the calcium sulfate is strongly hydrophilic. These facts probably account for the behavior of paints containing calcium sulfate when water is added to them. In some cases the addition of one cubic centimeter of water to a pint of such a paint causes the system to become a pasty almost solid mass. Even the presence of humid air will hinder paint grinding and mixing operations due to this excessive bodying. The mechanism of this effect is not well understood, but probably it is due to a flocculation of the pigment in the system with the resulting puffy frequently gel-like consistency.

The thickening of paints containing a calcium compound, particularly calcium sulfate, when water is added has heretofore made it practically impossible to use such pigments in the popular water containing paints. This phenomenon is usually referred to as water sensitivity and it is especially troublesome in the case of calcium sulfate containing pigments having a high oil absorption. Another characteristic of this type of pigment is the relative difficulty with which the pigment is mixed with an oil vehicle. They are not readily wet by the liquid and considerable power and time is consumed in the mixing operation.

This invention has as an object a process for the production of an improved pigment. A further object is the preparation of composite pigments, composed of prime pigments extended with calcium compounds, said composite pigments having improved properties of mixing, consistency, hiding power, oil absorption, and when incorporated in paints will exhibit excellent brushing qualities and unique low water sensitivity. A still further object is the treatment of pigments containing a calcium compound, particularly calcium sulfate, so as to increase the ease with which they may be incorporated in vehicles and to reduce the water sensitivity of the resulting paint. A still further object is the treatment of pigments containing calcium sulfate so as to decrease the water sensitivity and improve the leveling, resistance to yellowing and gloss of paints made from said pigments. Additional objects will become apparent from an examination of the following description and claims.

These objects are obtained according to the herein described invention which broadly comprises suspending calcined calcium sulfate in a solution of a compound adapted to give by reaction with calcium sulfate a calcium compound which is less soluble than calcium sulfate, thereafter dewatering and finishing the pigment. In this way one is able to obtain a modified calcium sulfate having intimately associated therewith a minor amount of a more insoluble calcium compound, specifically a portion of the calcium sulfate is transformed into another calcium compound such as, for example, calcium fluoride, calcium phosphate, calcium oxalate, and the like. It is believed that the latter adheres strongly to the surface of the remaining calcium sulfate and the pigment characteristics of the latter are thereby greatly altered.

In a more restricted embodiment this invention comprises treating a composite calcined calcium base pigment, e. g., calcium base titanium pigment in which the extender material comprises calcium sulfate possessing the structure of insoluble anhydrite, with a solution of a salt adapted to give by reaction with calcium sulfate a calcium compound less soluble than calcium sulfate, thereafter dewatering and finishing the pigment.

The preferred embodiment of this invention comprises subjecting a composite pigment comprising calcined titanium dioxide and calcined insoluble anhydrite to treatment in slurry form with a soluble phosphate, preferably an ammonium phosphate. After the interaction of the phosphate with the calcium sulfate of the pigment, the slurry is adjusted, if necessary, to a pH value of between about 7 and about 10 and thereafter the resulting pigment is dewatered and dried.

A preferred method of carrying out this invention comprises preparing a water slurry of a composite pigment comprising calcined anhydrite and calcined titanium dioxide and combining with this slurry a solution of diammonium phosphate in an amount chemically equivalent to between about 0.5% and about 2% of the calcium sulfate present in the pigment. After the addition of the phosphate if the slurry is somewhat acidic it may be neutralized by the addition of agents well-known in the art and the alkalinity of the slurry adjusted to a pH between about 7 and about 10. After thorough incorporation of the ingredients to effect uniformity, the slurry is further processed to obtain a dry pigment whose main ingredients are titanium dioxide and anhydrite calcium sulfate having intimately associated therewith an insoluble phosphate. The presence of this insoluble phosphate is believed to modify the surface of the calcium sulfate and thereby change its pigment properties.

The addition of the herein described agents is not limited to the procedure described above in connection with the phosphate. Thus, the agent may be added to a titanium dioxide slurry before the addition of the calcined calcium sulfate or it may be added to the calcined calcium sulfate prior to the blending of the calcium sulfate with the titanium dioxide pigment. Further, the pigment in the dry state may also be treated with the agents such as by spraying followed by micropulverizing which method gives a thorough mixing of the pigment and agent. One very effective way of applying this treatment to the calcined calcium sulfate containing pigment is to add the agent to the aqueous suspension and then add an alkaline substance such as ammonium, lime, sodium hydroxide, and the like, until the pH of the solution reaches some value at which the insoluble calcium compound is precipitated which is between a pH of about 7 and about 10.

The procedure for carrying out of my improved process can be varied depending upon the methods of producing the calcium sulfate pigment. It is recognized that there are various methods for the production of calcium sulfate. One may use precipitated gypsum as a starting point and this when put in slurry form can be treated by the addition of a suitable salt solution thereto. Crystal growth inhibitors are desirable in the event that the calcium sulfate is maintained in contact with water for a great length of time. In case the final pigment is to be anhydrite rather than gypsum, the conversion of gypsum to anhydrite may be carried out either in slurry form or by heat treatment under anhydrous conditions. The operation of this invention is then carried out subsequent to the formation of the anhydrite and prior to the final drying treatment. It is immaterial what order is used in adding the various ingredients to the treated slurry. In some instances it may be desirable to add the salt solution to the titanium oxide suspension and then subsequently add the calcium sulfate slurry, followed by stirring of the combined mixture. One might further practice a process which would involve treatment of a calcium sulfate slurry, as described above in the absence of a prime white pigment, drying of calcium sulfate alone and packaging same for use along with prime pigments in coating compositions. This may be further modified by dry blending the dried calcium sulfate with pigment quality titanium dioxide or another prime pigment just prior to packaging.

During the treatment of the anhydrite according to the herein described invention a double decomposition reaction is believed to take place. Thus, there is an exchange of sulfate ions for phosphate ions in instances where a phosphate is used as the treating agent. This reaction takes place readily under substantially neutral conditions and for this reason it is desirable to have the slurry substantially neutral and preferably on the alkaline side. In any event, however, the treated slurry should be adjusted for pH values and this is especially desirable when the slurry remains acidic after the treatment. Also, it is preferred to employ a salt rather than an acid, such as phosphoric acid, for the treatment.

This invention may be more readily understood from an examination of the following examples which are given for illustrative purposes and are not intended to place any restrictions or limitations on the herein described invention.

*Example I*

Calcium sulfate in the form of insoluble anhydrite was made by the process described in U. S. Patent 2,151,339, which involves the addition of a thick lime slurry to relatively strong sulfuric acid and maintaining an elevated temperature during the latter stages of the addition. Calcium sulfate precipitated in this manner is finely divided anhydrite possessing excellent pigment properties and well suited for use as an extender for prime white pigments such as zinc sulfide or titanium dioxide. The resultant anhydrite suspension was freed from the residual sulfuric acid by filtration and washing and further subjected to a calcination treatment at about 850° C. The calciner discharge was then dry ground in a ring roller mill, repulped in water and treated with diammonium phosphate chemically equivalent to 1% of the calcium sulfate. Immediately after the treatment it was dried and ready for use as an extender in paints.

*Example II*

Calcium sulfate was precipitated as in Example I and after filtration and washing was slurried with a finely ground titanium dioxide suspension such as is obtained by the process disclosed in U. S. Patent 1,937,037. The resulting suspension containing 30 parts of calcined $TiO_2$ for each 70 parts of $CaSO_4$ was then mixed with a solution of disodium phosphate chemically equivalent to .75 part per 100 parts of calcium sulfate in the suspension. After thorough mixing, the slurry was dewatered and dried for use as a pigment.

*Example III*

A low oil calcium base titanium pigment was prepared by digesting precipitated gypsum with dilute sulfuric acid to convert the same into anhydrite. The resulting anhydrite was filtered, washed, and blended with finely ground titanium dioxide under wet conditions and the composite pigment containing 30% $TiO_2$ and 70% calcium sulfate was calcined at 850° C. The calcined pigment was subsequently dry ground in the usual manner followed by wet treatment with diammonium phosphate. The pigment in this case was slurried with a minimum amount of water to form a fluid pulp and the ammonium phosphate added was equivalent to 1% of the calcium sulfate in the pigment.

It is to be understood that the herein specific embodiments of this invention may be subjected to modification and variation without departing from the scope thereof. Thus, while it is preferable to use a pigment containing calcined anhydrite this invention is not limited thereto since it applies to the treatment of pigments generally containing a calcined calcium compound as an essential component regardless of what process was employed in preparing the calcium compound. However, it should be understood that the calcium compound is not to be calcined subsequent to the herein described treatment.

Further, while the preferred application of this invention is directed to calcium sulfate-titanium dioxide pigments it is to be understood that it is not limited thereto since it applies also in the preparation of other calcium sulfate materials such as calcium lithopone and blends of gypsum with other prime pigments. Also, the herein described treatment may also be applied to composite pigments containing pigment useful substances other than or in addition to calcium sulfate, such as calcium carbonate in any of its forms, calcium fluosilicate, calcium silicate, calcium titanate, calcium tungstate, and the like.

Ammonium salts are especially suitable for use in the practice of this invention. Ammonium oxalates, ammonium fluorides, ammonium phosphates, said ammonium phosphates being the preferred group of agents, are conveniently used since they are quite soluble in water and the resulting soluble sulfate salt is readily removed after the treatment. However, other compounds which are soluble in water may be used in place of the ammonium salts without departing from the scope of this invention. These compounds are characterized by substantial water solubility and by the fact that the negative ion is precipitated from substantially neutral or alkaline water solution by calcium ions. The solubility product of the calcium salt should not exceed about $5 \times 10^{-5}$ or somewhat lower than the solubility product of calcium sulfate. Examples of other compounds which may be substituted for the ammonium salts include the sodium and potassium phosphates, sodium and potassium fluorides, and sodium and potassium oxalates. The acid salts as well as the neutral salts may also be advantageously employed. Treatments can also be made using organic phosphates such as glyceryl phosphates, cresyl phosphates, as well as using pyro- and metaphosphates. When using the acid care should be used so as to avoid acidic conditions. Regardless of the agent which is employed it is recommended that the pH of the pigment slurry after the treatment should be within the range of about 7 and about 10.

The amount of calcium sulfate transformed to a more insoluble compound by my treatment can vary somewhat and the amount of treating agent to be used should depend on the extent of the change in pigment properties desired. I find that an amount chemically or stoicometrically equivalent to about 5% of the calcium sulfate is usually sufficient and in no case should the amount exceed 10%. Less than about .1% does not modify the properties appreciably and when the treating compound is used within the limits of about .5% and 2.0%, the optimum paint properties are developed.

This invention is of special interest in the manufacture of calcium base titanium pigments. It is in this field that the greatest use is found because calcium sulfate and pigments containing it are especially water sensitive. This is believed due to the properties of calcium sulfate itself and by modification of the surface, as accomplished by the practice of this invention, one obtains a less sensitive pigment. Paints compounded with my treated calcium sulfate pigments thicken less upon the addition of water to the oil containing paint. Further, my pigments have been found to have improved film, color, yellowing resistance, as well as improved leveling characteristics when used in organic paint vehicles. Furthermore, the treated pigment has superior mixing properties and this is believed due to easier wetting of the pigment by the oil. Oxalate treated calcium sulfate is especially prominent in this respect.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. In a process for producing an improved pigment the step which comprises suspending a pigment comprising calcined calcium sulfate in a solution of a compound adapted to give by reaction with calcium sulfate a calcium compound which is less soluble than calcium sulfate, the amount of said compound in solution being chemically equivalent to between about 0.1% and about 10% of the calcium sulfate content.

2. In a process for the production of an improved pigment the step which comprises suspending a pigment comprising calcined calcium sulfate and calcined titanium dioxide in a solution of a water-soluble compound of an acid adapted to form by reaction a less soluble calcium compound than calcium sulfate, the amount of said water-soluble compound being chemically equivalent to between about 0.1% and about 10% of the calcium sulfate present in the pigment, adjusting the pH of the slurry to between about 7 and about 10 and thereafter dewatering and drying the resulting pigment.

3. In a process for producing an improved pigment the step which comprises suspending a pigment comprising calcined calcium sulfate in a solution of a soluble phosphate, the amount of said soluble phosphate present being chemically equivalent to between about 0.1% and about 10% of the calcium sulfate present in the pigment, adjusting the pH of the slurry to between about 7 and about 10 and thereafter dewatering and drying the resulting pigment.

4. In a process for producing an improved pigment the step which comprises suspending a pigment comprising calcined calcium sulfate in a solution of a soluble oxalate, the amount of said soluble oxalate present being chemically equivalent to between about 0.1% and about 10% of the calcium sulfate present in the pigment, adjusting the pH of the slurry to between about 7 and about 10 and thereafter dewatering and drying the resulting pigment.

5. In a process for producing an improved pigment the step which comprises suspending a pigment comprising calcined calcium sulfate in a solution of a soluble fluoride, the amount of said soluble fluoride present being chemically equivalent to between about 0.1% and about 10% of the calcium sulfate present in the pigment, adjusting the pH of the slurry to between about 7 and about 10 and thereafter dewatering and drying the resulting pigment.

6. In a process for the production of an improved pigment the step which comprises suspending a pigment comprising calcined calcium sulfate and calcined titanium dioxide in a solution of diammonium phosphate, the amount of diammonium phosphate employed being chemically equivalent to between about 0.1% and about 10% of the calcium sulfate present in the pigment, adjusting the pH of the slurry to between about 7 and about 10 and thereafter dewatering and drying the resulting pigment.

7. In a process for the production of an improved pigment the step which comprises suspending a pigment comprising calcined calcium sulfate and calcined titanium dioxide in a solution of ammonium oxalate, the amount of ammonium oxalate employed being chemically equivalent to between about 0.1% and about 10% of the calcium sulfate present in the pigment, adjusting the pH of the slurry to between about 7 and about 10 and thereafter dewatering and drying the resulting pigment.

8. In a process for the production of an improved pigment the step which comprises suspending a pigment comprising calcined calcium sulfate and calcined titanium dioxide in a solution of ammonium fluoride, the amount of ammonium fluoride employed being chemically equivalent to between about 0.1% and about 10% of the calcium sulfate present in the pigment, adjusting the pH of the slurry to between about 7 and about 10 and thereafter dewatering and drying the resulting pigment.

9. A calcium sulfate pigment comprising calcined calcium sulfate and calcined titanium dioxide, the particles of said pigment having a coating of uncalcined calcium phosphate.

10. A calcium sulfate pigment comprising calcined calcium sulfate and calcined titanium dioxide, the particles of said pigment having a coating of uncalcined calcium oxalate.

11. A calcium sulfate pigment comprising calcined calcium sulfate and calcined titanium dioxide, the particles of said pigment having a coating of uncalcined calcium fluoride.

12. A calcium sulfate pigment comprising a calcined calcium sulfate base and having a calcium compound coating on the pigment particles, said calcium compound being in the uncalcined condition and possessing a solubility product of less than about $5 \times 10^{-5}$.

13. A calcium sulfate pigment comprising a calcined calcium sulfate base and having a calcium compound coating on the pigment particles, said calcium compound being in the uncalcined condition and possessing a solubility product of less than about $5 \times 10^{-5}$ and being present in an amount chemically equivalent to between about 0.1% and about 10% of the calcium sulfate content.

14. In a process for the production of an improved pigment the step which comprises suspending a pigment comprising a calcined calcium base titanium pigment in a solution of a soluble phosphate, the amount of soluble phosphate employed being chemically equivalent to between about 0.1% and about 10% of the calcium base present in the pigment, adjusting the pH of the slurry to between about 7 and about 10 and thereafter dewatering and drying the resulting pigment.

15. A calcined sulfate pigment comprising calcined calcium sulfate and calcined titanium dioxide, the particles of said pigment having a coating of uncalcined calcium phosphate, said uncalcined calcium phosphate being present in an amount chemically equivalent to between about 0.1% and about 10% of the calcium sulfate content.

16. A calcium sulfate pigment comprising calcined calcium sulfate and calcined titanium dioxide, the particles of said pigment having a coating of uncalcined calcium oxalate, said uncalcined oxalate being present in an amount chemically equivalent to between about 0.1% and about 10% of the calcium sulfate content.

17. A calcium sulfate pigment comprising calcined calcium sulfate and calcined titanium dioxide, the particles of said pigment having a coating of uncalcined calcium fluoride, said uncalcined calcium fluoride being present in an amount chemically equivalent to between 0.1% and about 10% of the calicum sulfate content.

18. In a process for producing an improved pigment the step which comprises suspending a pigment comprising calcined calcium sulfate in a solution of a soluble phosphate, the amount of said soluble phosphate present being chemically equivalent to between about 0.5% and about 2% of the calcium sulfate present in the pigment, adjusting the pH of the slurry to between about 7 and about 10 and thereafter dewatering and drying the resulting pigment.

19. In a process for the production of an improved pigment the step which comprises suspending a pigment comprising calcined calcium sulfate and calcined titanium dioxide in a solution of diammonium phosphate, the amount of diammonium phosphate employed being chemically equivalent to between about 0.5% and about 2% of the calcium sulfate present in the pigment, adjusting the pH of the slurry to between about 7 and about 10 and thereafter dewatering and drying the resulting pigment.

20. A calcium sulfate pigment comprising calcined calcium sulfate and calcined titanium dioxide, the particles of said pigment having a coating of uncalcined calcium phosphate, said uncalcined calcium phosphate being present in an amount chemically equivalent to between about 0.5% and about 2% of the calcium sulfate content.

RAY L. McCLEARY.

CERTIFICATE OF CORRECTION.

Patent No. 2,266,233.                                December 16, 1941.

RAY L. McCLEARY.

It is hereby certified that error appears in the printed specification of the above numbered patent requiring correction as follows: Page 4, second column, line 26, claim 16, for "oxolate" read --calcium oxalate--; and that the said Letters Patent should be read with this correction therein that the same may conform to the record of the case in the Patent Office.

Signed and sealed this 17th day of February, A. D. 1942.

(Seal)

Henry Van Arsdale,
Acting Commissioner of Patents.